E. WEICKE:
Cutter-Heads for Drilling-Machines.
No. 142,133. Patented August 26, 1873.
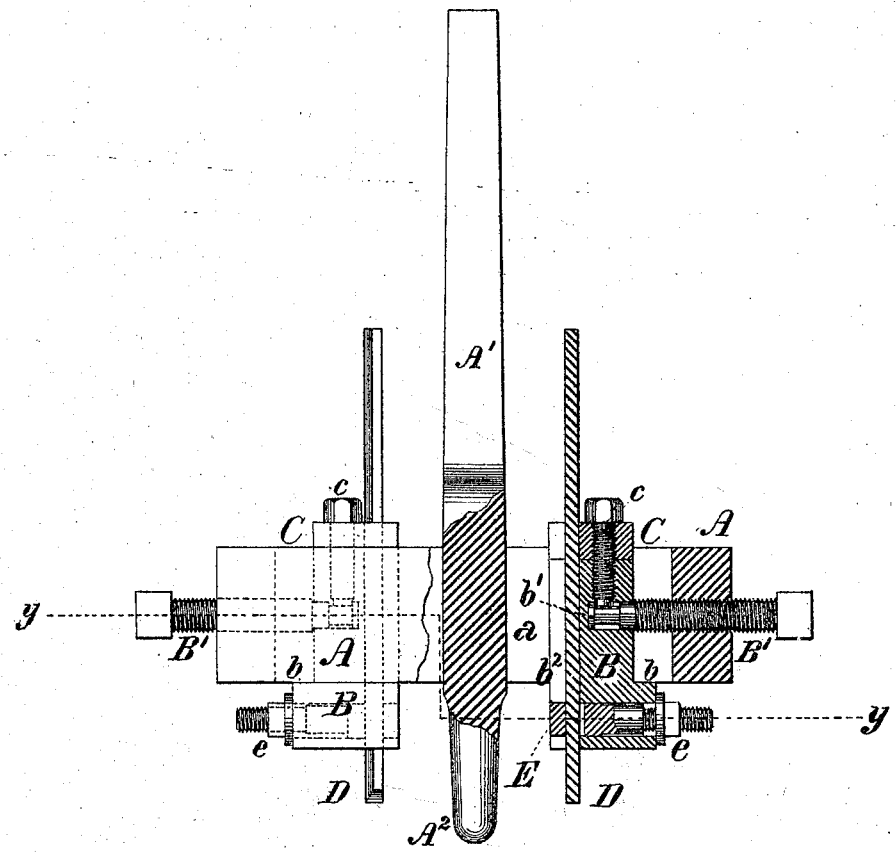
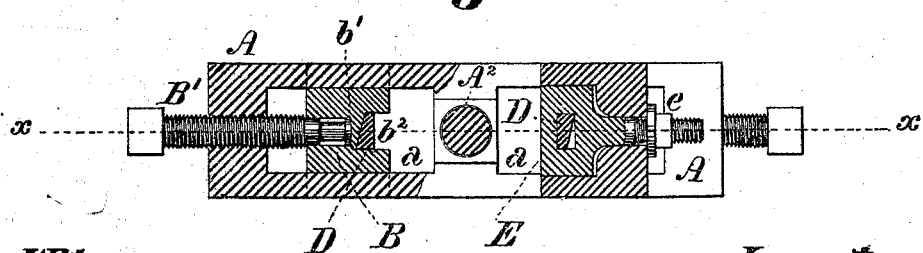

UNITED STATES PATENT OFFICE.

EDWARD WEICKE, OF PHILADELPHIA, PENNSYLVANIA.

IMPROVEMENT IN CUTTER-HEADS FOR DRILLING-MACHINES.

Specification forming part of Letters Patent No. 142,133, dated August 26, 1873; application filed June 18, 1873.

*To all whom it may concern:*

Be it known that I, EDWARD WEICKE, of the city and county of Philadelphia, in the State of Pennsylvania, have invented certain new and useful Improvements in Cutter-Heads for Drilling-Machines, of which the following is a specification:

The object of my invention is to provide improved means for securing the cutters in the cutter-head, as well as for adjusting them relatively to the axis of the drill-spindle, for the purpose of cutting holes of different diameters; to which ends my improvements consist in combining, with a slotted cutter-head, carriers adjustable therein, and stirrups for securing the cutters to the carriers, as hereinafter more fully set forth.

My invention is particularly applicable to use in the manufacture of steam-boilers, for cutting the holes in the tube-sheets into which the tubes are inserted; and as the diameters of the tubes used vary in different boilers, and even in the same boiler, economy of construction is greatly facilitated by the ability to use the same cutter-head for cutting holes of different diameters, instead of requiring a separate one for each diameter to be cut. Moreover, by the use of my invention I am enabled to utilize nearly the whole length of the cutters, by regrinding them as they become worn, instead of being obliged to replace them with new ones when the major portion of them remains intact, as is ordinarily the case, owing to the present methods of securing them to the cutter-head. I also secure the cutters firmly in their positions, and readily tighten them at any time should they become loose.

In the accompanying drawings, Figure 1 is a view of a cutter-head embodying my improvements, the same being shown partly in elevation and partly in section at the line $x$ $x$ of Fig. 2; and Fig. 2, a longitudinal section through the same at the line $y$ $y$ of Fig. 1.

The cutter-head A, which is, by preference, made of square or rectangular section, is provided with a long shank, $A^1$, for connection to the socket of the drill-spindle, and a center, $A^2$, to maintain it in proper position upon the work, the shank and center being concentric with the cutter-head and with each other. Longitudinal slots $a$ are formed in the cutter-head, in each of which a carrier, B, is neatly fitted, the carriers being held in position vertically by lips or flanges $b$ formed upon them, and flanged caps C secured to them by bolts $c$. The carriers are moved longitudinally in the slots $a$ by screws $B'$ rotating freely in suitable recesses formed in the carriers, and engaging nuts formed in the ends of the cutter-head A. In this instance, the screws $B'$ are shown as held in position in the carriers by the cap-bolts $c$, against which collars $b^1$, formed on the screws, bear when the screws are rotated, so as to draw the carriers outward from the center of the cutter-head, the collars bearing against the ends of the recesses in the carriers when moving them inward. By this arrangement the carriers, to which the cutters are attached, as hereinafter described, can be moved toward or from the center of the cutter-head at pleasure, so as to cut holes of different diameters, as required, and be readily and accurately adjusted at any desired point.

It is obvious that other means may be employed for connecting the screws $B'$ to the carriers, if preferred—as, for example, by using caps or covers to confine the collars, such caps being bolted to the outer faces of the carriers, or they may rest in recesses elongated vertically, so as to enable the collars to be placed in position before the caps C are bolted on.

The cutters D are formed of straight bars of steel, of trapezoidal section, and tempered throughout their whole length, so that they may be ground off as they become worn. They rest in grooves $b^2$ formed in the carriers B, the inner edges of the grooves being inclined correspondingly with the faces of the cutters, and are clamped fast therein by stirrups E, which pass through the carriers, and are provided with threaded ends and nuts $e$ for drawing them up to proper bearing in the carriers.

I am thus enabled to hold the cutters securely in position, and to readily remove and replace them when they require to be ground; and being of uniform section and temper throughout their lengths they can be reground as often as required, until so far worn that they cannot be held by the stirrups.

My invention is readily applicable to the ordinary drilling-machines, and the cutters will operate equally well at any point in their range of motion. The facilities of adjustment which it affords will be apparent to those familiar with boiler-work, and in practice I have found it to be of great service in such manufacture.

I claim as my invention—

The cutter-head A, in combination with the carrier B, flanged cap C, bolt $c$, adjusting-screw B', tool D, and the stirrup E, as and for the purpose shown and described.

EDWARD WEICKE.

Witnesses:
 FRANCIS D. PASTORIUS,
 EDMUND P. COCHRAN.